(12) United States Patent
Balb et al.

(10) Patent No.: US 7,757,064 B2
(45) Date of Patent: Jul. 13, 2010

(54) METHOD AND APPARATUS FOR SENDING DATA FROM A MEMORY

(75) Inventors: Markus Balb, Munich (DE); Peter Mayer, Neubiberg (DE); Wolfgang Spirkl, Germering (DE); Christoph Bilger, Munich (DE); Martin Brox, Munich (DE); Thomas Hein, Munich (DE); Michael Richter, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 552 days.

(21) Appl. No.: 11/530,015

(22) Filed: Sep. 7, 2006

(65) Prior Publication Data

US 2008/0065851 A1 Mar. 13, 2008

(51) Int. Cl.
*G06F 12/00* (2006.01)
(52) U.S. Cl. .................. 711/171; 711/105; 711/156; 365/230.03

(58) Field of Classification Search .............. 711/171, 711/105, 156; 365/230.03
See application file for complete search history.

(56) References Cited

U.S. PATENT DOCUMENTS

| | | | |
|---|---|---|---|
| 4,315,308 A | | 2/1982 | Jackson |
| 5,913,046 A | * | 6/1999 | Barth et al. ................. 712/208 |
| 6,122,688 A | | 9/2000 | Barth et al. |
| 6,452,863 B2 | | 9/2002 | Farmwald et al. |
| 7,428,689 B2 | * | 9/2008 | Wallner et al. ............. 714/763 |
| 2005/0071542 A1 | * | 3/2005 | Weber et al. ................ 711/105 |

* cited by examiner

*Primary Examiner*—Stephen C Elmore
(74) *Attorney, Agent, or Firm*—Patterson & Sheridan, L.L.P.

(57) ABSTRACT

A method of sending data on request from a memory to a device, wherein the memory receives a request from the device for sending predetermined data to the device, wherein the memory sends data and information about the data to the device.

18 Claims, 4 Drawing Sheets

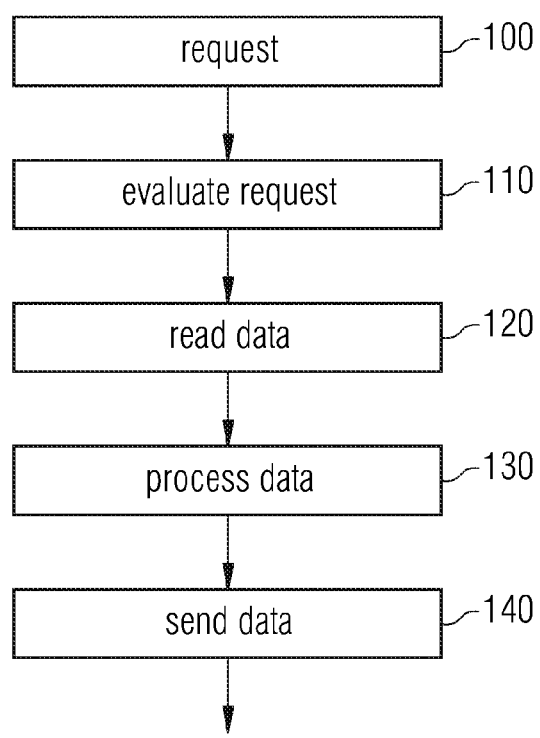

METHOD AND APPARATUS FOR SENDING DATA FROM A MEMORY

BACKGROUND OF THE INVENTION

1. Field of the Invention

The invention generally relates to memory devices and more particularly to metadata about, and sent with, requested data.

2. Description of the Related Art

Semiconductor memories have been designed and structured to use one memory device for each bit, or small group of bits, of any individual computer word, where the word size is governed by the choice of a requesting device. Typical word sizes range from 4 to 64 bits. Each memory device typically is connected in parallel to a series of address lines and connected to one of a series of data lines. When the requesting device, for example a controlling processing unit (CPU), seeks to read from or write to a specific memory or location, an address is put on the address lines and some or all of the memory devices are activated using a separate device select line for each needed device. One or more devices may be connected to each data line, but typically only a small number of data lines are connected to a single memory device.

Data is thus provided in parallel for each memory read or write operation. For the system to operate properly, every single memory bit in every memory device must operate dependably and correctly.

In a conventional system, the CPU sends a request to a memory device, for example a dynamic random access memory (DRAM), a static RAM (SRAM) or a read only memory (ROM). The request includes command information to read data from the memory and address information that determines the addresses of the memory cells of the memory from which the data may be read. The memory evaluates the request and reads the data from the determined memory cells referring to the transferred addresses and sends the data to the CPU.

In conventional systems, the request may include a length information for requesting data with different numbers of data bits. Thus, it is possible for the requesting device to receive or read different numbers of data bits from the memory.

SUMMARY OF THE INVENTION

An embodiment of the invention refers to a method for sending data on request from a memory to a device, whereby the memory receives a request from the device for sending predetermined data to the device, whereby the memory sends data and information about the data to the device, whereby the information describes the number or size of data that are actually transferred to the device.

A further embodiment of the invention provides a method for sending data on request from a DRAM memory to a device, whereby the DRAM memory receives a request from the device for sending predetermined data to the device, whereby the DRAM memory sends data and information about the data to the device, whereby the information describes the number of data that are actually transferred to the device.

Furthermore, an additional embodiment of the invention provides a method of sending data on request from a memory to a device, whereby the memory receives a request from the device for sending predetermined data, whereby the memory reads the requested data from a memory core, whereby the memory processes the read data according to a process mode, whereby the memory sends the processed data and process information about the process mode to the device.

Another embodiment of the invention provides a memory with an interface that receives a request and that sends data packets as an answer to the request comprising a memory core that stores data, a read circuit that reads, upon request, data from the memory core, a processing circuit that processes the read data before sending the data at least in one data packet by the interface, the processing circuit checks the number of data, generates information about the number of data that are sent with the data packet and adds the information to the data packet.

A further embodiment of the invention provides a DRAM memory with an interface that receives a request and that sends data packets as an answer to the request, wherein the DRAM memory includes a memory core that stores data, a read circuit that reads, upon request, data from the memory core, a processing circuit that processes the read data before sending the data at least in one data packet via the interface, wherein the processing circuit checks the number of data, generates information about the data that are sent with the data packet and adds the information to the data packet.

Furthermore, another embodiment of the invention provides a memory with an interface that receives a request and that sends data packets as an answer to the request, wherein the memory includes a memory core that stores data, a read circuit that reads upon request data from the memory core, a processing circuit that processes the read data according to a predetermined process mode, wherein the process circuit adds process information about the performed process mode to the processed data and sends, via the interface, the processed data with the process information in at least one data packet.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 depicts a schematic process flow according the function of the memory, according to one embodiment.

DETAILED DESCRIPTION OF THE PREFERRED EMBODIMENT

The embodiments of the invention may be described in terms of various functional components. It should be appreciated that such functional components may be realized by any number of hardware or structural components configured to perform the specified functions. For example, embodiments of the invention may employ various integrated components comprised of various electrically devices, such as resistors, transistors, capacitors, diodes and such components, the behavior of which may be suitably configured for various intended purposes. In addition, the embodiments of the invention may be practiced in any integrated circuit application where an effective reversible polarity is desired. Such general applications may be appreciated by those skilled in the art in light of the present disclosure are not described in detail. Further, it should be noted that various components may be suitably coupled or connected to other components within exemplary circuits, and that such connections and couplings can be realized by direct connection between components and by connections through other components and devices located in between.

An embodiment of the invention generally relates to a method for sending data on request from a memory to a device and to a memory with an interface that receives a request and that sends data packets as an answer to the request. More particularly, an embodiment of the invention relates to a method for sending data on a request that may differ from the requested data. Furthermore, another embodiment of the invention relates more particularly to a memory that comprises a processing circuit that processes the data that are read on a request and that sends the processed data with information about the data, for example information on the number of data and/or an information about the processing of the data.

Figure 1:
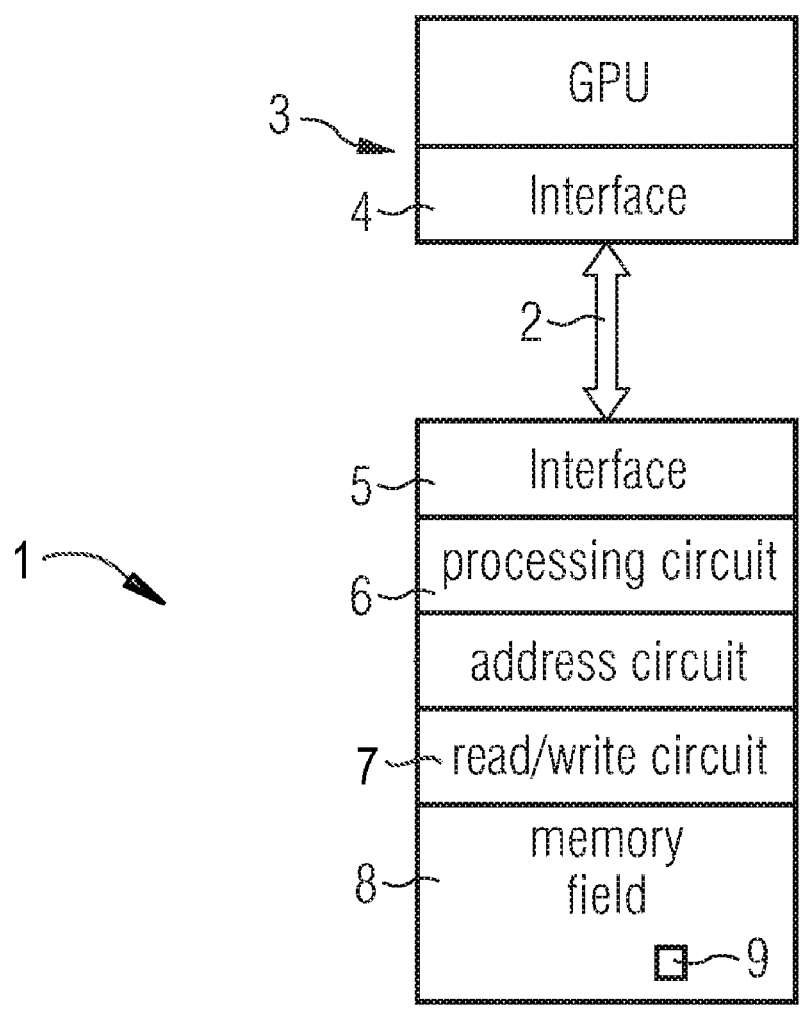
FIG. 1 is a schematic view of a memory that is connected with a requesting device, according to one embodiment.

FIG. 1 depicts a schematic view of a system comprising a memory 1, a data channel 2 and a device 3, according to one embodiment.

The memory 1 may be a memory device such as a DRAM memory, an SRAM memory or a ROM memory or a memory circuit that may be used for storing data and reading data from memory cells. The data channel 2 may be constituted by any data path that may be used for sending a request from the device 3 to the memory 1 and sending upon the request data from the memory 1 to the device 3. The data channel may be a data bus, a radio transmission path or an optical transmission path that is disposed between the memory 1 and the device 3. The device 3 may be constituted by any device that may request data from the memory 1; for example, the device 3 may be a processing unit, a central processing unit or a graphic processing unit.

In a particular embodiment, the device 3 may be a graphic processing unit with a first interface 4 that sends request signals by the data channel 2 to the memory 1. Furthermore, the first interface 4 receives answer signals from the memory 1 over the data channel 2.

The memory 1 comprises a second interface 5 that is connected with the data channel 2 for receiving a request signal and for sending an answer signal over the data channel 2 to the device 3. The second interface 5 is connected with a processing circuit 6. The processing circuit 6 is connected with a read/write circuit 7. The read/write circuit 7 is connected with a memory core 8 that comprises memory cells 9 for storing data. The memory cells 9 may comprise memory elements for example capacitors that may be addressable individually by switches, for example, transistors. Instead of capacitors, the memory cells 9 may comprise resistive elements that are used for storing data. Depending on the embodiment, the memory cells 9 may be addressable in predetermined numbers and/or arrays. Depending on the embodiment, there may be several memory cores 8 that are connected by one or several read/write circuit 7 to one or several processing circuits 6 with one second interface 5.

Figure 2:
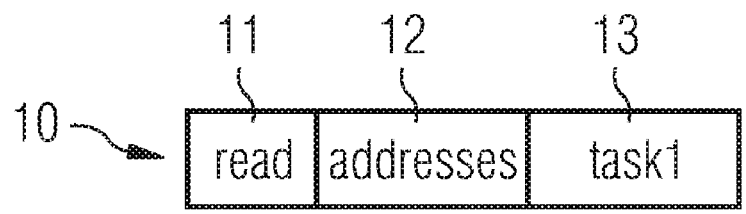
FIG. 2 depicts a request packet, according to one embodiment.

In operation, the graphic processing unit (GPU) 3 initiates an operation for reading out data from the memory 1 by sending a request signal via the first interface 4 over the data channel 2 to the memory 1. The request signal may include information, data and/or commands as depicted in FIG. 2. FIG. 2 depicts an exemplary request signal comprising a command field 11, an address field 12 and a task field 13.

In the depicted embodiment, a read command is stored in the command field 11, column addresses are stored in the address field 12 and "task 1" is stored in the task field 13. The information of the request signal 10 is that the memory 1 may read out data that are stored in the memory cells 9 of the memory 1 with the addresses that are stored in the address field 12. Furthermore, the request signal 10 states this request as the task 1 request. In a further embodiment, the request signal 10 may only comprise a number field 12 that determines how many data should be read out of the memory 1 and sent to the GPU 3. The address field 12 determines the number of data that may be read out.

The request signal is received by the second interface 5 and passed to the processing circuit 6. The processing circuit 6 evaluates the request signal 10. In the depicted embodiment, the processing circuit 6 gets the information by the request signal 10 to read out data that are stored in memory cells with the addresses that are stored in the address field 12 and to send the read data to the device 3.

The processing circuit 6 delivers this information to the read/write circuit 7. The read/write circuit 7 reads from the memory cells 9, that are determined by the addresses in the address field 12, the stored data from the memory core 8 and delivers the read data to the processing circuit 6.

In one embodiment, the processing circuit 6 sends the read data with information about the data to the device 3 via the second interface 5, the data channel 2 and the first interface 4. The information about the data may comprise information about the number of data, the quality of the data or information about the structure of the data. The number of data may comprise information about the number of digital data bits or the digital data words or the data frames that are sent as an answer to the request. In one embodiment, the information may comprise the number of digital data bits. In another embodiment the information may comprise the number of data words. In a further embodiment the information may comprise the number of data frames that are sent back on the request.

Figure 3A:
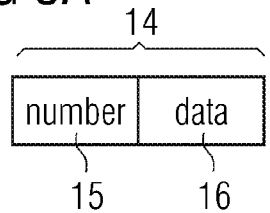
FIG. 3 depicts different answer packets, according to one embodiment.

In one embodiment, the processing circuit 6 generates a data frame 14 that comprises a number field 15 and a data field 16, as depicted in FIG. 3a. The number field 15 contains the number of the data that are included in the data field 16. In the data field 16 at least one digital bit is included. The data field 16 may comprise several digital bits or data words comprising digital bits.

The first interface 4 receives the data frame 14 and analyzes the data frame 14. The device 3 analyzes the number field 15 and the data field 16. The information about the number of the data may be used for the subsequent processing of the data that are included in the data field 16.

Figure 3B:
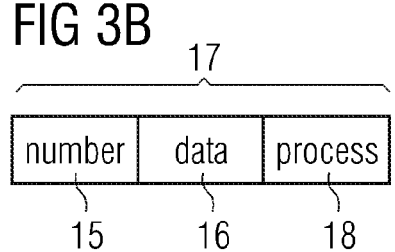

In a further embodiment, the processing circuit 6 sends back upon request a second data frame 17, as shown in FIG. 3b. The second data frame 17 comprises a number field 15, a data field 16 and a process field 18. The number field 15 comprises the number of data that are included in the data field 16. The data field 16 comprises the data that are sent to the device 3 by the memory 1. The data field 16 may be divided in data packets, where each data packet comprises several digital data bits. The process field 18 comprises information about a task that was processed for generating the data. In one embodiment, the process field 18 may comprise information that states that the data were read from predetermined numbers of memory cells 9. Depending on the embodiment, the process field 18 may comprise further information about the process that was used for generating the data, for example, information that the data were read from the memory cells 9 and processed according to a predetermined process mode. The process mode may be, for example, a compression method that is used for compressing the data to reduce the number of data that has to be transmitted to the device 3. In a further embodiment, the process mode may be checking the data for redundant data and only sending non redundant data to the device 3.

In the case that the read data were compressed before sending to the device 3, then the processing circuit 6 stores in the process field 18 the information that the sent data are compressed according a predetermined compression method. Thus, the processing circuit 6 sends a second data frame 17 to the device 3.

If the processing circuit is in the process mode to deliver the requested data not in one but in several second data frames 17, then the second data frames 17 include, in the number field 15, how many data are included in the data field 16 and, in the process field 18, information about, for example, which process mode was used and information about which part of the requested data are included in the second data frames 17. The part information may comprise the information that the data are distributed in a predetermined number of second data frame 17. The information in the process field 18 may also comprise specify that a predetermined part of the data that are requested with a predetermined task with the request signal 10 are now included in this second data frame 17.

Figure 3C:
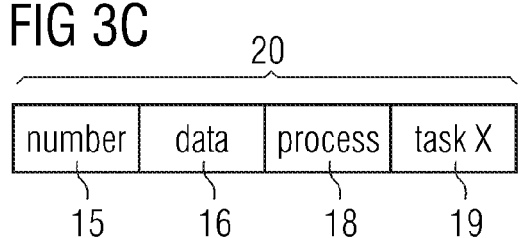

Depending on the embodiment, the processing circuit 6 may use a third data frame 20 that is depicted in FIG. 3c comprising a number field 15, a data field 16, a process field 18 and a task field 19. The task field comprises the information to which task (i.e. to which request) of the device 3 the third data frame belongs.

Figure 3D:
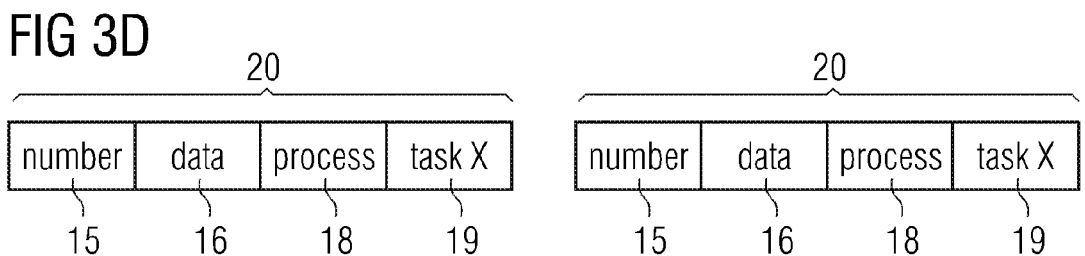

In a further embodiment, a requested number of data may be sent back using two data frames, for example, two third data frames 20, as depicted in FIG. 3d. In this embodiment, the processing circuit 6 sends the requested data to the device 3 using two third data frames 20, each comprising a number field 15, a data field 16, a process field 18 and a task field 19. The task field 19 may contain information specifying that the third data frames 20 belong to the same request, which means that a first part of data are included in the first third data frame 20 and a second part of data are included in the second third data frame 20 as depicted in FIG. 3d.

The device 3 that receives the data frames 14, the second data frame 17 and/or the third data frames 20 may use the information about the received data for the further processing. For example, the device 3 may restore the compressed data according to the used compression method that is indicated in the process field 18. Additionally, the device 3 may use the information that some of the requested data are redundant data.

Using the described method, the device 3 can more easily process the data and/or change further requests for reducing the number of requested data from the memory 1. Additionally, the device 3 may use the additional information about the sent data for evaluating the function of the memory 1, in particular the function of the memory cells 9 in the memory core 8.

Furthermore, one embodiment of the invention may provide an advantage in that the memory 1 may modify the requested data and send with the data information about the modification. Furthermore, an embodiment of the invention may save bandwidth and power on the interfaces if compression algorithms are used for shortening or splitting the data transfer. Therefore, the memory 1 may send length information at the beginning of a data burst to indicate to the device 3 (for example, a memory controller) how many data are valid by the actual burst. In this embodiment, the data field 16 may comprise a burst of data packets that belong to one data frame.

An embodiment of the invention uses a frame structure in data exchange between a memory and a device for example a graphic processing unit to exchange additional information to the data, in particular length information of a started data burst. This method enables the memory to shorten or split the data exchange without a dedicated request from the memory controller. Using for example length information allows a data compression method for saving power by shortening the data transmission time and the amount of transferred data bits. Furthermore, the method allows using the length information together with a compression method and additionally a redundancy to realize a more stable data transfer between the memory and the controller whereby longer or shorter data bursts may occur. Furthermore, an embodiment of the invention allows an enhanced frame structure for adding additional information for example a check sum or other data for securing the data transmission between the memory and the device for example allowing data correction mechanism e.g. parity bits.

Figure 4:
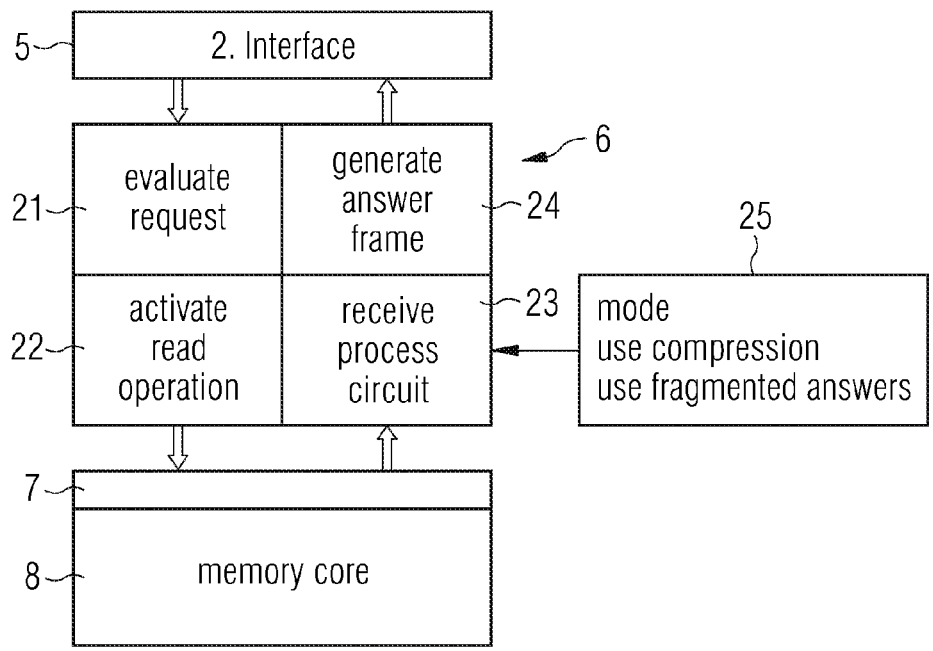
FIG. 4 depicts a greater detail of the processing circuit of the memory of FIG. 1, according to one embodiment.

FIG. 4 depicts in a greater detail a structure of a processing circuit 6 that is arranged between the second interface 5 and the memory core 8 with the read/write circuit 7. The processing circuit 6 comprises an evaluate block 21, an activate block 22, a process block 23 and a generate block 24.

The evaluate block 21 receives the request signal 10 and evaluates the request signal 10. The evaluate block 21 checks the command field 11 and/or the address field 12 and/or the task field 19. Depending on the information of the request signal 10, the evaluate block 21 activates the activate block 22 to process the command that is stored in the command field 11 considering the address field 12. The activate block 22 processes the requested command, for example a read operation using the read/write circuit 7. The process block 23 receives the read data that were requested by the activate block 22 from the read/write circuit 7. The process block 23 stores the read data and processes the stored data according to a process mode that is determined by an input signal 25. The input signal 25 may be stored in the memory core 8 or may be generated by the processing circuit 6 depending, for example, on a further input information. The process mode may be compressing the read data and sending compressed data to the device 3, checking the read data for redundancy and sending only the non-redundant data to the device 3 or generating a predetermined number of data frames for sending the requested data to the device 3.

Depending on the input signal 25, the process block 23 processes the read data according to the determined process mode. The processed data are then delivered from the process block 23 to the generate block 24. The generate block 24 generates a data frame 14 and/or a second data frame 17 and/or a third data frame 20 comprising the information as discussed for FIG. 3. The generated data frame is sent by the generate block 24 over the second interface 5 to the device 3.

Figure 5:
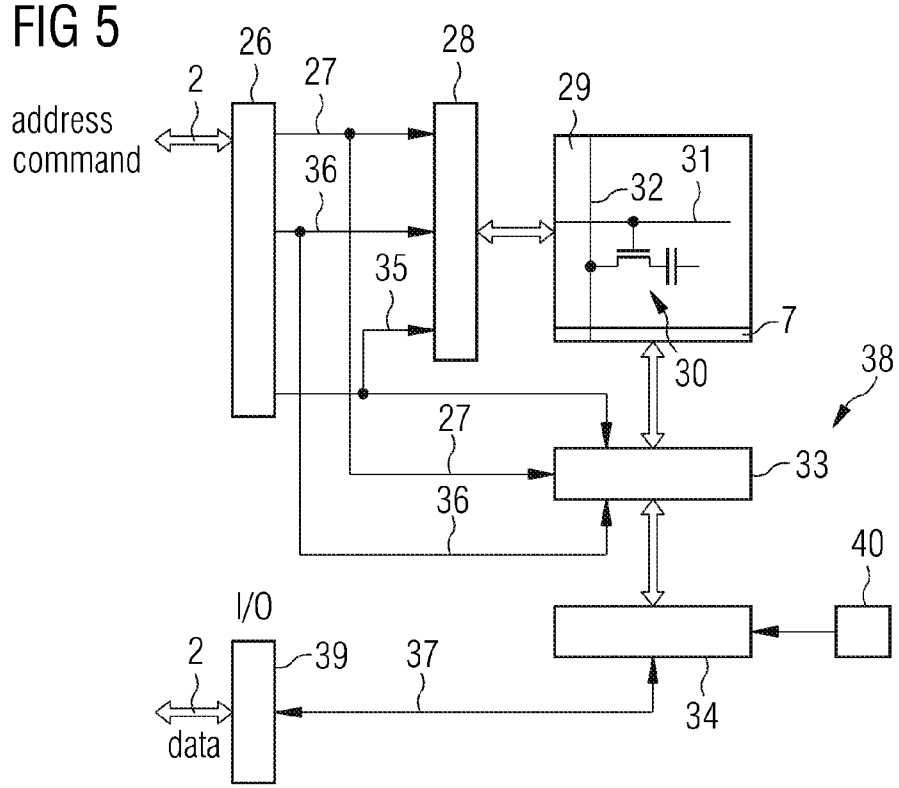
FIG. 5 depicts a schematic view of a DRAM, according to one embodiment.

FIG. 5 depicts a dynamic random access memory circuit 38. In FIG. 5 only these parts of a dynamic random access memory circuit 38 are disposed that are important for the understanding of an embodiment of the invention. The dynamic random access memory circuit 38 comprises a memory controller 26, an I/O unit 39, a row decoder 28, column decoder 33, a memory field 29 with second memory cells 30 and a second processing circuit 34. The memory controller 26 is connected by an address bus 27 with the row decoder 28 and the column decoder 33. Furthermore, the memory controller 26 is connected by a clock line 36 with the row decoder 28 and the column decoder 33. Additionally, the memory controller 26 is connected with a command line 35 with the row decoder 28 and the column decoder 33. The column decoder 33 is connected with the second processing circuit 34. The second processing circuit 34 is connected by a data path 37 with the I/O unit 39. The row decoder 28 is connected with a plurality of word lines 31 that are disposed in the memory field 29. In the FIG. 5 only one word line 31 is depicted. The column decoder 33 is connected with a plurality of bit lines 32, whereby in FIG. 5 only one bit line 32 is depicted. At crossing points of word lines 31 and bit lines 32 second memory cells 30 are disposed in the memory field 29. The word lines 31 are connected with switching elements for example transistors that are arranged between a bit line 32 and a storage element for example a capacitor of a second memory cell 30.

The memory controller 26 is connected by a data channel 2 with a device 3. Address data and command signals are received by the memory controller 26 and data are exchanged between the device 3 and the DRAM circuit 38 over the I/O unit 39 that is also connected to the data channel 2.

If the device 3, for example a graphic processing unit wants to read out a predetermined data from the DRAM circuit 38, the device 3 sends a request signal 10 (depicted in FIG. 2) by the data channel 2 to the memory controller 26. The memory controller 26 receives the request signal 10. The request signal 10 may comprise a read command in the command field 11 and addresses of second memory cells 30 in the address field 12 from which the stored data should be read out and transferred to the device 3. The task field 13 may comprise a predetermined task to which this request belongs. The memory controller 26 delivers the addresses that comprise column and row addresses to the row decoder 28 and to the column decoder 33. Furthermore, the memory controller 26 delivers the command to read out data to the column decoder 33. Furthermore, the memory controller 26 sends a clock signal for the read operation to the row decoder 28 and the column decoder 33. The row decoder 28 activates according to the received addresses predetermined word lines 31 connecting second memory cells 30 with respective bit lines 32. Depending on the data that are stored in the addressed second memory cells 30 and that were connected to bit lines 32, the voltage on the respective bit lines 32 and/or the resistance of the respective bit lines 32 may be changed. Furthermore, the column decoder 33 selects according to the received column addresses respective bit lines 32 and reads out the data that are stored in the selected second memory cells 30.

The read data were transferred from the column decoder 33 to the second processing circuit 34. The second processing circuit 34 is connected with a mode block 40 that determines a process mode for processing the delivered read data. The second processing circuit 34 processes the delivered data according to the determined process mode and generates a data frame 14 or a second or a third data frame 17, 20. The data frame 14 or the second or third data frame 17, 20 is delivered by the data path 37 to the I/O unit 39. The I/O unit 39 sends the data frame to the device 3 over the data channel 2.

Depending on the request signal 10, the DRAM circuit 38 may read out a predetermined number of data that are stored in determined second memory cells 30. In one embodiment, read data are processed by the DRAM circuit 38 according to a process mode. The process mode may be selected by the DRAM circuit 38 by itself or may be determined from a further controlling unit for example by the device 3.

FIG. 6 depicts a schematic view of the process that is processed by the DRAM circuit 38 on the receiving of the request signal 10. At step 100 the DRAM circuit 38 receives the request signal 10. Then the request signal 10 is evaluated by the memory controller 26 at step 110. After the evaluation of the request signal, the DRAM circuit 38 reads out the predetermined memory cells at step 120. Then the read data are processed by the second processing circuit 34 at step 130. The processed data are delivered from the second processing circuit 34 over the I/O unit 39 to the requesting device 3 at step 140 in data frames 14 or second or third data frames 17, 20.

While the foregoing is directed to embodiments of the present invention, other and further embodiments of the invention may be devised without departing from the basic scope thereof, and the scope thereof is determined by the claims that follow.

What is claimed is:

1. A method of sending data from a memory to a device, comprising
    receiving, by the memory, a request from the device for sending the data to the device; and
    responsive to the request, sending the data and information about the data from the memory to the device; wherein the information specifies a size of data that are sent to the device, wherein the information specifying the size of data is generated by the memory.

2. The method of claim 1, wherein the information and the data are sent to the device in a data frame.

3. The method of claim 1, wherein the information and the data are sent to the device in a plurality of separate data frames, wherein each respective data frame includes information about the size of data that are in the respective data frame.

4. The method of claim 1, further comprising compressing, by the memory, the requested data to a smaller size, wherein the information specifies the smaller size of the compressed data and specifies that the compressed data contained in the frame are compressed.

5. The method of claim 1, further comprising:
    checking, by the memory, a redundancy of the requested data; and
    if there are redundant data in the requested data, then sending, by the memory, only the non-redundant data, and wherein the information specifies a size of the non-redundant data in the data frame.

6. The method of claim 5, wherein the memory provides information to the device indicating which of the requested data are redundant.

7. The method of claim 1, wherein sending the data and information about the data comprises sending the data in two separate data frames, each data frame comprising information about the size of the data included in the respective data frame.

8. The method of claim 7, wherein each data frame includes information that identifies to which request of the device the data frame belongs.

9. A method of sending data from a dynamic random access memory (DRAM) memory to a device, comprising:
    receiving, by the DRAM memory, a request from the device for sending data to the device;
    reading, by the DRAM memory, the requested data; and
    sending the requested data and information about the requested data from the DRAM memory to the device, wherein the information describes a size of the data that are sent to the device, wherein the information specifying the size of data is generated by the memory.

10. A method of sending data from a memory to a device, comprising:
receiving, by the memory, a request from the device for sending data to the device;
reading the requested data from a memory core;
processing the read memory according to a process; and
sending the processed data and process information about the process from the memory to the device in the form of a data frame,
wherein the process is a compression process that produces compressed data and wherein the compressed data are sent to the device with information indicating that the compressed data are compressed.

11. A memory with an interface that receives a request and that sends data frames in response to the request, the memory comprising:
a memory core that stores data;
a read circuit that reads data from the memory core in response to the request; and
a processing circuit that processes the read data before sending the data in at least one data frame via the interface, wherein the processing circuit checks a size of the data, generates information about the size of the data and adds the information to the data frame.

12. The memory of claim 11, wherein the processing circuit divides the read data in at least two separate data frames; and the processing circuit generates for each of the data frames information about the size of data that are in the respective data frames.

13. The memory of claim 11, wherein the processing circuit:
compresses the read data to a smaller size of compressed data;
generates information about a size of the compressed data; and
sends the compressed data with the information about the size of the compressed data in at least one data frame via the interface.

14. The memory of claim 13, wherein the processing circuit inserts information about the compression in the data frame.

15. The memory according to claim 11, where the processing circuit adds data correction information in the data frame.

16. A DRAM memory with an interface that receives a request and that sends data frame in response to the request, the memory comprising:
a memory core that stores data;
a read circuit that reads data from the memory core in response to the request; and
a processing circuit that:
processes the read data before sending the data in at least one data frame via the interface;
checks the data;
generates information about the data; and
adds the generated information to the data frame,
wherein the processing circuit checks a size of data that are sent with the data frame, generates information about size of the data, and adds the information about size number of the data to the data frame.

17. A system, comprising the memory of claim 11 and a plurality of electrical components, the plurality of electrical components and the memory being disposed on a substrate, wherein at least one of the plurality of electrical components is a memory controller.

18. A system, comprising the DRAM memory of claim 16 and a plurality of electrical components, the plurality of electrical components and the memory being disposed on a substrate, wherein at least one of the plurality of electrical components is a memory controller.

* * * * *